United States Patent
Giraud et al.

[19]

[11] Patent Number: 6,155,520
[45] Date of Patent: Dec. 5, 2000

[54] BRACKET HINGED PANEL

[75] Inventors: Christian Jean Raymond Giraud; Roland Jocelyn Félicien Chave, both of Vitrolles, France

[73] Assignee: Eurocopter, France

[21] Appl. No.: 09/150,978

[22] Filed: Sep. 11, 1998

[30] Foreign Application Priority Data

Sep. 12, 1997 [FR] France .................................. 97 11384

[51] Int. Cl.[7] ...................................................... B64C 1/14
[52] U.S. Cl. ............................ 244/129.4; 49/70; 16/260; 160/210
[58] Field of Search ............................ 244/129.4, 129.5; 49/70; 16/260, 261, 360, 364, 366, 368, 370, DIG. 36

[56] References Cited

U.S. PATENT DOCUMENTS

| | | | |
|---|---|---|---|
| 2,095,192 | 10/1937 | Decker | 362/478 |
| 2,494,347 | 1/1950 | Matthews | 16/260 |
| 2,763,900 | 9/1956 | Mcafee et al. | 49/70 |
| 4,697,763 | 10/1987 | Vermilye | 244/129.4 |
| 5,107,570 | 4/1992 | Feith | 16/261 |

FOREIGN PATENT DOCUMENTS

| | | |
|---|---|---|
| 0 407 319 | 1/1991 | European Pat. Off. . |
| 2 562 136 | 10/1985 | France . |
| 8 809 479 | 11/1988 | Germany . |

*Primary Examiner*—Peter M. Poon
*Assistant Examiner*—Francis T. Palo
*Attorney, Agent, or Firm*—Piper Marbury Rudnick & Wolfe

[57] ABSTRACT

The present invention is relative to a panel hinged on a receiving part, along at least one curved contour edge, by means of two hinges which define a geometric axis of rotation around which the panel pivots between an open position and a closed position. The panel includes fittings intended to engage, during rotation of the panel between its open and closed positions, with reception fittings carried by the receiving part, in order to press the aforesaid curved edge of the panel against the receiving part, the fittings fixed to the panel describing a curved trajectory the center of which is situated on the axis of rotation around which the panel pivots.

3 Claims, 2 Drawing Sheets

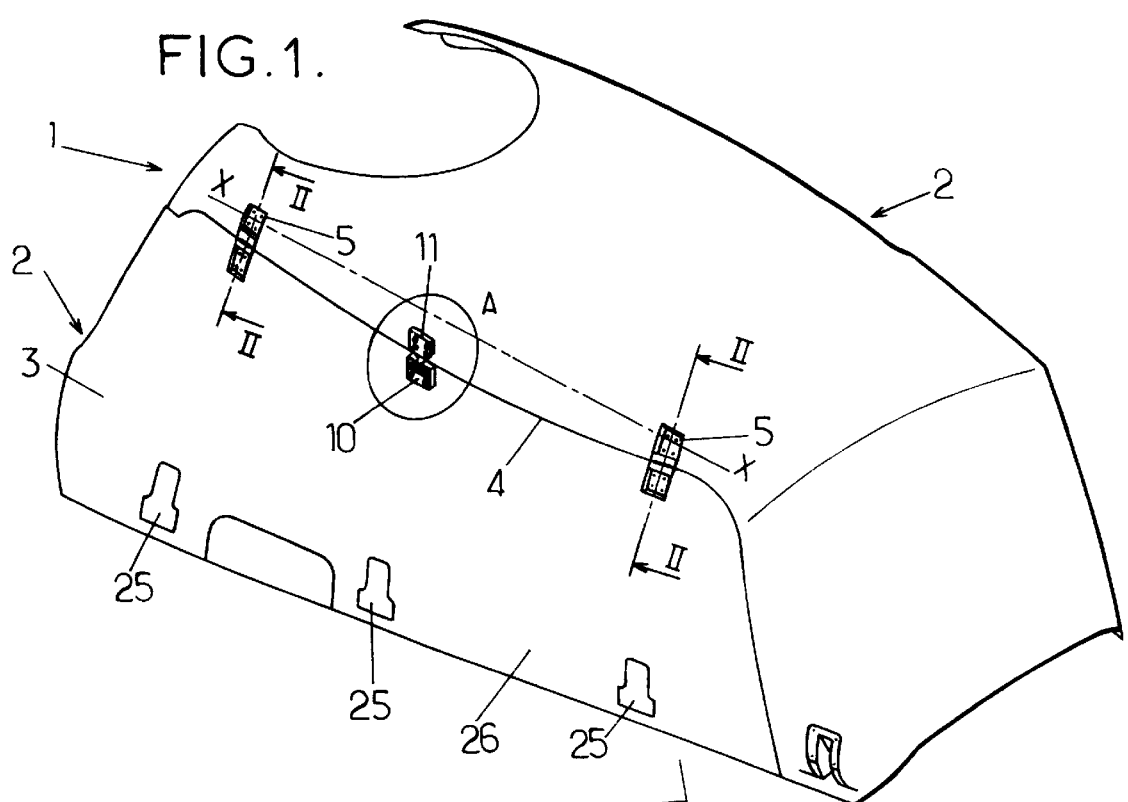
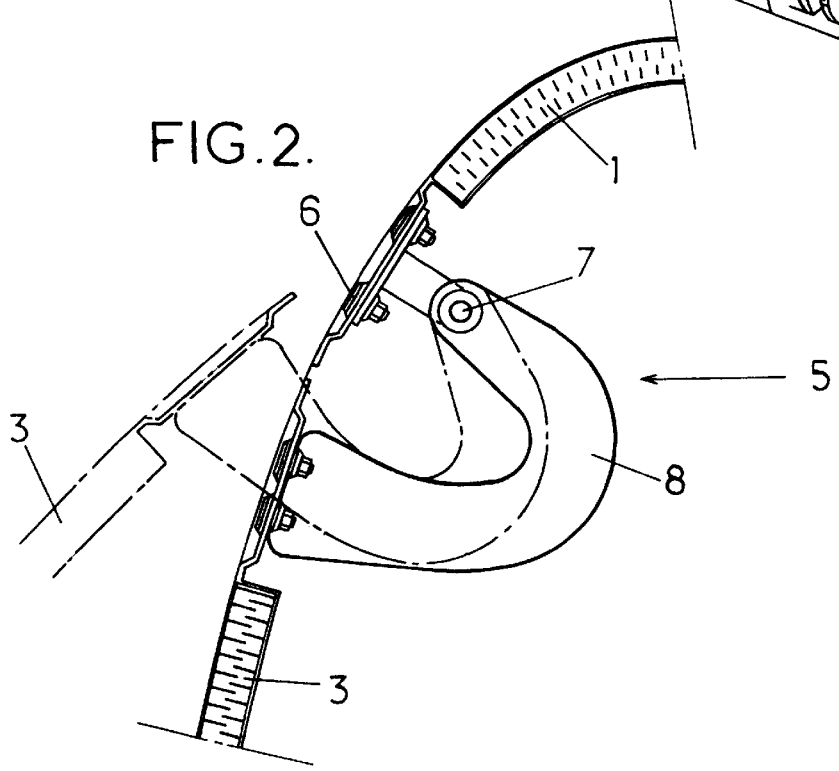

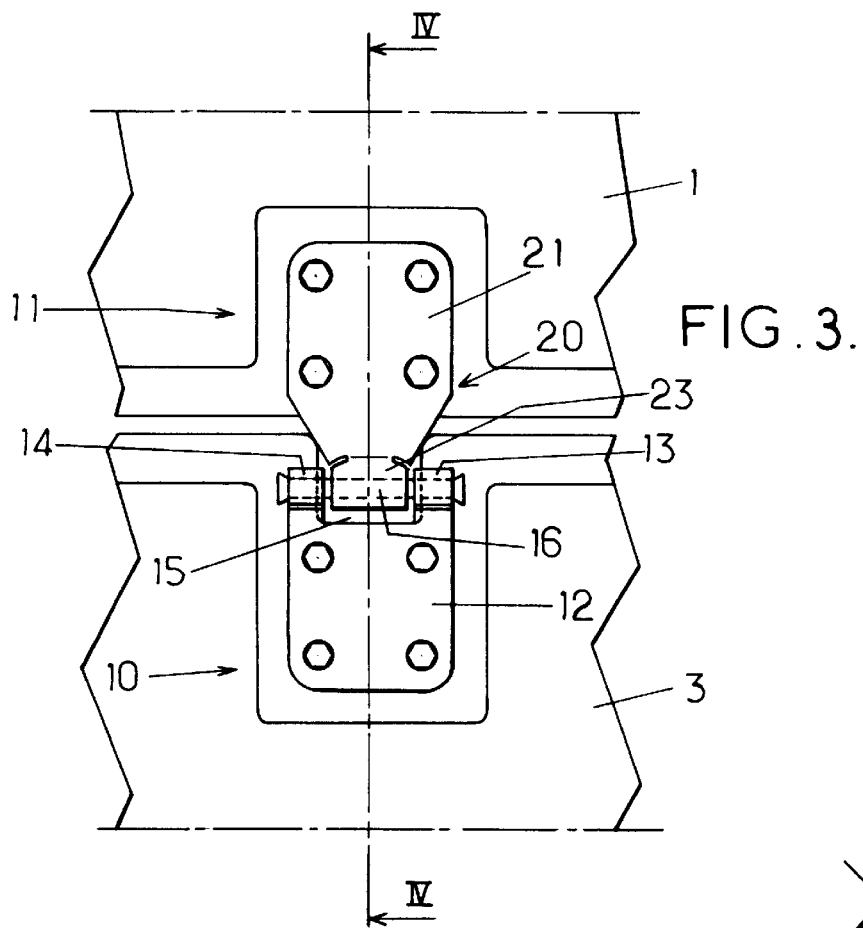
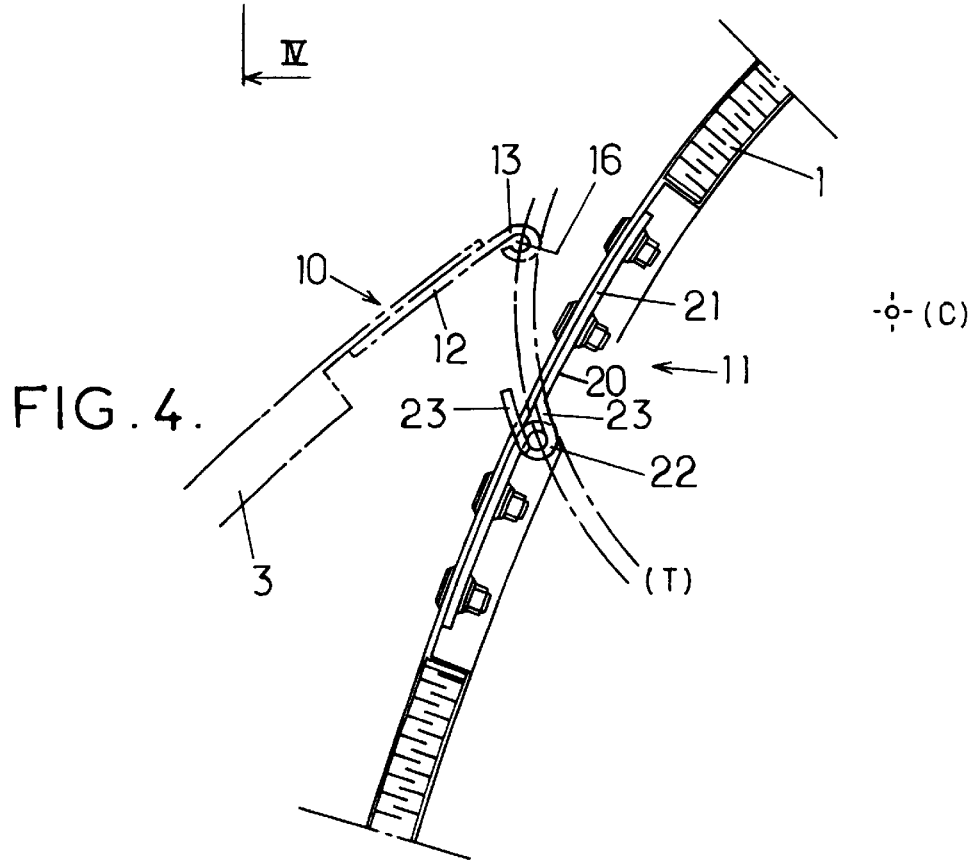

BRACKET HINGED PANEL

FIELD OF INVENTION

The present invention is relative to a panel hinged on a receiving part, along at least one curved contour edge, by means of two hinges which define a geometrical rotation axis around which the panel pivots between an open position and a closed position.

The invention applies particularly to helicopters which have covers, being used as the receiving part, and on which the panels are hinged, in order for example to protect an engine block.

BACKGROUND OF THE INVENTION

For aerodynamic reasons, the covers usually have curved or rounded shapes and they are often of large size. Now, in order to ensure wide accessibility to the objects located inside the cover, the panels must be able to be opened with the possibility of large clearances. To this end, they have on the length of their edge around which they pivot, hinges which can be of the "swan neck" type.

However, this type of hinge is expensive to make, and is of relatively high mass and bulk.

Also, it has already been proposed that one of the elements in the aforesaid panel edge and the receiving part includes fitting means intended to engage, during rotation of the panel between its open and closed positions, with reception means carried by the other of the elements in the aforesaid edge and the receiving part, in order to press the aforesaid curved edge of the panel against the receiving part, the means firmly attached to the panel describing a curved trajectory the center of which is situated on the axis of rotation around which the panel pivots, the fitting means including a pin with axis parallel to the geometrical axis of rotation of the panel and the reception means including a bracket. In the known solutions, the engagement of the pin and the bracket do not enable a sure closing of the cover.

The invention has the objective of remedying the inconveniences mentioned above by providing a hinged panel which has a number of reduced "swan neck" hinges all ensuring a good hold of the longitudinal edge of this panel, around which it is hinged, along the engine cover.

SUMMARY OF THE INVENTION

To this end, in accordance with the invention, a hinged panel of the aforementioned type, is essentially characterized in that the bracket is carried by the receiving part and the pin is carried by the panel, the pin describing, parallel to itself, a curved trajectory the center of which is situated on the axis of rotation during the rotation of the panel.

The hinged panel in accordance with the invention can possibly comprise in addition one or more of the following characteristics:

the pin is placed in a recess made close to the edge;
the bracket is of general U shape, including a bottom and two arms between which the pin penetrates, the arms having a curved shape the center of curvature of which is situated on the axis of rotation around which the panel pivots;
the pin and the bracket are located between the aforesaid two hinges; and
the two hinges are of the "swan neck" type.

BRIEF DESCRIPTION OF THE DRAWINGS

An example of a version of the invention is now to be described with reference to the appended drawings, on which;

FIG. 1 is a perspective view of a cover intended to be connected on a helicopter engine floor (not shown) and which has a panel hinged in accordance with the present invention:

FIG. 2 is a section view along the lines II—II of FIG. 1, in which the panel is shown in the open position and the closed position;

FIG. 3 is a front view of the zone A of the cover of FIG. 1 and in which have been shown the fitting means and the reception means of the panel in accordance with the present invention; and FIG. 4 is a section view along the line IV—IV of FIG. 3 and in which the panel is shown in the closed position and the open position.

DETAILED DESCRIPTION OF THE PREFERRED EMBODIMENT

FIG. 1 shows a cover 1 intended to be connected onto the airframe of a helicopter (not shown), and in particular at the level of the engine block floor in order to protect the helicopter engine.

The cover 1 is of a general parallelepiped shape with a rectangular base and has on each of its side faces 2 a hinged panel 3.

The side faces 2 of the cover 1 are in addition of curved or rounded form in order to ensure a good aerodynamic shape to the helicopter.

The panel 3 is hinged to the cover 1 along one edge 4, here called the longitudinal edge.

To this end, the cover 1 has two hinges 5 of the "swan neck" hinge type shown in transverse section in FIG. 2.

Insofar as where the longitudinal edge 4 is curved, the hinges 5 are of significant size in relation to the general dimensions of the cover in order to enable large clearances of the panel 3 during its opening and closing.

The hinges 5, of the "swan neck" type, are known professionally and each include a base 6 fixed to the cover 1 which supports an axis of rotation 7 around which pivots a curved arm 8 fixed to the panel 3.

The axes of rotation 7 of the two hinges 5, parallel to the longitudinal dimension of the cover, define a geometrical axis of rotation X—X of the panel 3 on the cover 1.

In order to press the longitudinal edge 4 of the panel 3 onto the cover 1, the panel 3 has fitting means 10 intended to engage with the reception means 11 fixed to the cover. These fitting and reception means are placed approximately at mid-length of the longitudinal edge 4, in the zone A located between the two hinges 5, and are shown in more detail in FIGS. 3 and 4.

The fitting means 10 fixed to the movable panel include an anchoring brace 12 fixed on the rounded wall of the panel 3 and which includes two arms 13 and 14 the ends of which are curved on themselves. These two arms 13 and 14 define between them a recess 15. A pin 16, with longitudinal axis parallel to the geometrical rotation axis X—X, is supported by the aforesaid two arms 13 and 14.

During rotation of the panel 3 around its geometrical axis X—X, between its open and closed positions, the pin 16 is rotated, parallel to itself on a curved trajectory T having for its center a point C situated on the geometrical axis of rotation X—X.

The reception means 11 fixed to the cover 1 include a bracket 20 which has a base 21 extending onto the cover 1 and continuing with a U shape, having a bottom 22 and two curved arms 23.

The bracket 20 is turned outwards from the cover so that the pin 16 can, during its rotation, penetrate between the two arms 23 and abut in the bottom 22. To this end, the two arms 23 have the same curvature as the trajectory T that is, they have a curved shape the center of curvature of which is also the point C.

When the panel 3 is in the open position such as shown in FIGS. 2 and 4 in chain dotted lines, the pin 16 is disengaged from the bracket 20 in order to be located above it. The panel 3 is fixed to the cover 1 only by the two swan neck hinges 5.

In order to close the cover 1, the panel 3 is closed down on it. The pin 16 describes then, parallel to itself, a circular trajectory T in order to fit in the bracket 20, between the arms 23. The panel 3 is then immobilized on the cover 1 by professionally known fixing means 25, shown in FIG. 1, and located at the level of a longitudinal edge 26 of the panel 3 opposite the longitudinal edge 4.

In this closed position, the longitudinal edge 4 of the panel 3 is held firmly applied, over all its length, on the cover by means of the pin 16 inserted in the bracket 20. The pin 16 is held all the more firmly in the bracket 20 as the fixing means 25 exert a downwards pull on the panel 3.

As a variant, it is understood that the fitting 10 and reception 11 means can be placed beyond the two hinges 5, when the length of the panel 3, on either side these hinges, is important.

We claim:

1. A closing device comprising a swiveling panel hinged on a fixed structure by means of two hinges of the "swan neck" type disposed along one curved edge of an opening of said structure, said panel and opening having mating corresponding edge shapes, and said hinges defining together a geometrical axis of rotation (X, X) on which said panel can pivot between an open condition and a closed condition of said opening, wherein one of the ends of each of said "swan neck" type hinges is pivotally linked either on said structure or on said panel and its opposite end is fixedly mounted, respectively, either on the panel or on said structure, wherein said curved edge of the opening comprises between said hinges a first locking means cooperating, when the panel is in said closed condition of the opening of said structure, with a complementary second locking means of the panel, and wherein fixing means are provided on the edge of the panel opposite the curved edge of said opening, said fixing means being designed to immobilize the panel in its closed condition on said structure.

2. A closing device according to claim 1, wherein said first locking means comprises a bracket fixed on said structure and said second locking means comprises a pin fixed on said panel, the bracket having a general U shape including a bottom and two arms between which said pin can enter when closing the panel, the arms having a curved shape the center of curvature of which is situated on the axis of rotation (C) around which the panel can swivel.

3. A closing device according to claim 1, wherein one of the ends of each of said "swan neck" type hinges is pivotally linked on said structure and its opposite end is fixedly mounted on the panel.

* * * * *